US012491056B2

(12) United States Patent
Shelander

(10) Patent No.: US 12,491,056 B2
(45) Date of Patent: Dec. 9, 2025

(54) AEROSOL REMOVAL SYSTEM

(71) Applicant: Vairion LLC, Roseville, MN (US)

(72) Inventor: Weston Shelander, Roseville, MN (US)

(73) Assignee: Vairion LLC

( * ) Notice: Subject to any disclaimer, the term of this patent is extended or adjusted under 35 U.S.C. 154(b) by 76 days.

(21) Appl. No.: 18/461,606

(22) Filed: Sep. 6, 2023

(65) Prior Publication Data

US 2024/0307162 A1 Sep. 19, 2024

Related U.S. Application Data

(60) Provisional application No. 63/452,545, filed on Mar. 16, 2023.

(51) Int. Cl.
*A61C 19/00* (2006.01)
*B08B 15/02* (2006.01)

(52) U.S. Cl.
CPC ............ *A61C 19/007* (2013.01); *B08B 15/02* (2013.01)

(58) Field of Classification Search
None
See application file for complete search history.

(56) References Cited

U.S. PATENT DOCUMENTS 3,292,525 A * 12/1966 Jensen ................ F24C 15/2028 219/400
3,303,839 A * 2/1967 Tavan ................ F24C 15/2028 454/67
3,425,335 A * 2/1969 Black .................... B08B 15/023 454/57
3,457,850 A * 7/1969 Sweet ................ F24C 15/2028 55/DIG. 36
3,537,447 A 11/1970 Gauthier et al.
3,727,540 A * 4/1973 Galluzzo ................ B08B 15/00 454/67
4,483,316 A * 11/1984 Fritz ......................... F24F 9/00 454/67

(Continued)

OTHER PUBLICATIONS

Chen et al., The effectiveness of an air cleaner in controlling droplet/aerosol particle dispersion emitted from a patient's mouth in the indoor environment in dental clinics, J.R. Soc. Interface (2010) 7, 1105-1118, published online Nov. 23, 2019, doi:10.1098/rsif.2009.0516.

(Continued)

*Primary Examiner* — Joseph A Dillon, Jr.
(74) *Attorney, Agent, or Firm* — Headland Law & Strategy; Matthew J. Smyth

(57) ABSTRACT

Systems and methods for removing aerosolized particles from a treatment zone may be employed with dental, medical or veterinarian procedures. An exemplary system may include a hood and corresponding evacuation system that creates a negative-pressure current that draws aerosolized particles away from a treatment zone and into the evacuation system. Such an exemplary system may also include an air curtain generator that creates a "curtain" comprising streams of pressurized air around the treatment site that may help to direct aerosolized particles into the hood and evacuation system and prevent many such aerosolized particles from escaping the curtain.

11 Claims, 6 Drawing Sheets

(56) References Cited

U.S. PATENT DOCUMENTS

| | | | | |
|---|---|---|---|---|
| 4,906,261 | A * | 3/1990 | Mohajer | A61M 1/79 55/482 |
| 5,127,411 | A | 7/1992 | Schoolman et al. | |
| 5,997,399 | A * | 12/1999 | Szatmary | F24F 3/163 454/187 |
| 6,634,411 | B2 * | 10/2003 | Hirano | B22D 45/005 164/113 |
| 6,851,421 | B2 * | 2/2005 | Livchak | F24C 15/2028 126/299 R |
| 6,962,403 | B2 * | 11/2005 | Smith | B41J 2/1714 347/34 |
| 7,318,771 | B2 * | 1/2008 | Huang | B25H 1/20 454/61 |
| 7,503,842 | B2 * | 3/2009 | Lee | F24C 15/2028 454/67 |
| 7,699,051 | B2 * | 4/2010 | Gagas | F24C 15/2028 126/299 R |
| 9,388,996 | B2 * | 7/2016 | Ray | F24F 9/00 |
| 10,953,126 | B1 * | 3/2021 | Masek | A61L 9/20 |
| 10,982,486 | B1 * | 4/2021 | Avant | A47H 23/10 |
| 11,242,999 | B2 * | 2/2022 | Livchak | F24C 15/20 |
| 11,730,849 | B2 * | 8/2023 | Benedek | B01D 53/96 422/4 |
| 2006/0154590 | A1 * | 7/2006 | Kanaya | F24C 15/2028 454/56 |
| 2006/0278216 | A1 * | 12/2006 | Gagas | F24C 15/2028 126/299 D |
| 2007/0113839 | A1 * | 5/2007 | Lee | F24C 15/2028 126/299 D |
| 2012/0297741 | A1 * | 11/2012 | Reid | B23K 37/006 137/15.01 |
| 2014/0202445 | A1 * | 7/2014 | Lyons | F24F 13/0245 29/897.3 |
| 2018/0050371 | A1 * | 2/2018 | Leisner | B08B 15/002 |
| 2021/0346119 | A1 * | 11/2021 | White | A61L 9/122 |
| 2021/0353395 | A1 | 11/2021 | Kim et al. | |
| 2021/0396394 | A1 * | 12/2021 | Woods | F24C 15/2035 |
| 2021/0396405 | A1 * | 12/2021 | Crank | B01D 53/86 |
| 2021/0401557 | A1 | 12/2021 | Sheu | |
| 2022/0000597 | A1 | 1/2022 | Simpson, Jr. et al. | |
| 2023/0405173 | A1 * | 12/2023 | Dolynchuk | F21V 33/0064 |

OTHER PUBLICATIONS

Versaci, Products marketed to sanitize, reduce dental aerosols may lack research to support efficacy, American Dental Association, May 22, 2022.

Pallardy, The dentist's guide to buying air scrubbers, Ontario Academy of General Dentistry, available online at www.agd.org/constituent/news/2021/02/15/the-dentists-guide-to-buying-air-scrubbers (accessed Oct. 13, 2022).

Zhao et al., Using an air purifier as a supplementary protective measure in dental clinics during the coronovirus disease 2019 (COVID-19) pandemic, Infection Control and Hospital Epidemiology (2020), 1-2.

Ceiling-Mount Aerosol Extractor HA-CMSC-G2-W-AEA Owner's Manual, Health Air Inc. (undated).

* cited by examiner

AEROSOL REMOVAL SYSTEM

CROSS-REFERENCE TO RELATED APPLICATIONS

This application claims the benefit of U.S. Provisional Application Ser. No. 63/452,545, titled "AEROSOL REMOVAL SYSTEM," filed on Mar. 16, 2023, and this application incorporates the entire contents of the foregoing application herein by reference.

TECHNICAL FIELD

Various implementations relate generally to removing aerosols from a treatment zone.

BACKGROUND

Dental procedures, medical procedures and veterinary procedures may all produce aerosolized particles that may present hazards to dentists, hygienists, oral surgeons and laboratory technicians; surgeons, surgical technicians and nurses; and veterinarians and veterinarian assistants. Various systems have been developed to evacuate such aerosolized particles near treatment zones; but many such systems are cumbersome and ineffective.

SUMMARY

Disclosed herein are systems and methods for removing aerosolized particles from a treatment zone associated with dental, medical or veterinarian procedures. An exemplary system may include a hood and corresponding evacuation system that creates a negative-pressure current that draws aerosolized particles away from a treatment zone and into the evacuation system. Such an exemplary system may also include an air curtain generator that creates a "curtain" comprising streams of pressurized air around the treatment site that may help to direct aerosolized particles into the hood and evacuation system and prevent many such aerosolized particles from escaping the curtain.

DETAILED DESCRIPTION

Disclosed herein are systems and methods for removing aerosolized particles from a treatment zone associated with dental, medical or veterinarian procedures. An exemplary system may include a hood and corresponding evacuation system that creates a negative-pressure current that draws aerosolized particles away from a treatment zone and into the evacuation system. Such an exemplary system may also include an air curtain generator that creates a "curtain" comprising streams of pressurized air around the treatment site that may help to direct aerosolized particles into the hood and evacuation system and prevent many such aerosolized particles from escaping the curtain.

Figure 1:
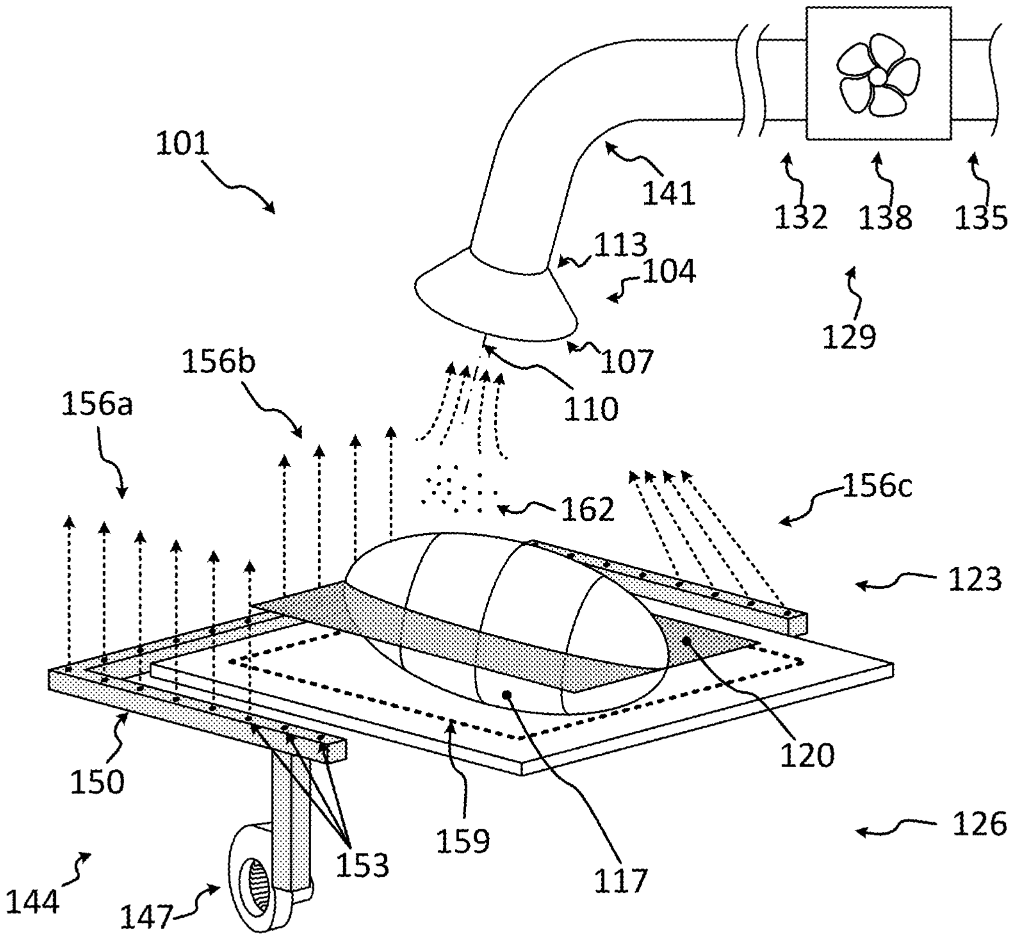
FIG. 1 illustrates an exemplary aerosol removal system.

FIG. 1 illustrates an exemplary aerosol removal system 101. As shown, the aerosol removal system 101 includes a hood 104 having an inlet 107 with a central axis 110; and an outlet 113. The hood 104 may be configured to be positioned above a treatment zone 117 for a human or non-human patient undergoing a medical, dental or veterinary procedure.

In some implementations, the hood 104 is configured to be positioned such that the central axis 110 is substantially normal to a plane 120 corresponding to the treatment zone. (As used herein, "substantially" may mean within 45°, or within 30°, or within 25°, or within 20°, or within 15°, or within 10°, or within 5°, or within 2° or within 1° of normal). In some implementations, the plane 120 may divide the vicinity around the treatment zone 117 into a first side 123 (e.g., a region "above" the treatment zone 117) and a second side 126 (e.g., a region "below" the treatment zone 117).

The aerosol removal system 101 may further include an evacuation system 129 having an intake 132, an exhaust 135 and a pressure-differential generator 138. In some implementations, the pressure-differential generator 138 is a fan or a blower that creates a difference in pressure between the exhaust 135 and the intake 132, such that air (and particles and aerosolized particles contained therein) is drawn into the intake 132 and expelled from the exhaust 135. In some implementations, the evacuation system 129 may generate a pressure difference of about 0.1 to three inches of water; and the evacuation system 129 may draw an airflow of between 50 and 300 cubic feet per minute (CFM).

The evacuation system 129 may be coupled to the hood 104 via a conduit 141. More specifically, the conduit 141 may fluidly couple the outlet 113 of the hood 104 to the intake 132 of the evacuation system 138. In some implementations, the conduit 141 may be a flexible hose or tube, and the hood 104 may be supported by another structure (not shown). In other implementations, the conduit 141 may be a segmented and articulated tube that provides structural support and configurability for the hood 104 (see, for example, FIGS. 3A-3C) and simultaneously fluidly couples the outlet 113 to the intake 132.

The aerosol removal system may further include an air curtain generator 144. As shown, the air curtain generator 144 includes a compressor 147 that compresses air and delivers it to a manifold 150, from which it may be forcefully ejected from a plurality of outlets 153. In some implementations, the air may be forcefully ejected in streams that are substantially perpendicular to the outlets 153 in a manner that forms air curtains 156*a* and 156*b*. In other implementations, the air may be forcefully ejected in streams that are angled relative to the outlets 153 to form a curtain 156*c* that slopes toward the hood 104. In some implementations, the flow from the compressor 147 may be 25 CFM, 50 CFM, 80 CFM, approximately 25-150 CFM, etc.

In some implementations, the plurality of outlets 153 are circumferentially disposed around a substantial portion of a periphery 159 of the treatment zone 117. As used herein, "circumferentially" may refer to any periphery, whether circular or not; and a "substantial portion" may refer to 20%, 30%, 40%, 50%, 60%, 75% or more of the periphery.

The hood 104 may be disposed above the treatment zone 117 (e.g., above the plane 120 associated with the treatment zone 117, on a first side 123 of the plane 120); and the air curtain generator 144 may be disposed below the treatment zone 117 (e.g., below the plane 120 associated with the treatment zone 117, on a second side 126 of the plane 120).

In implementations such as the one illustrated by FIG. 1 and described with reference thereto, the air curtains 156*a*, 156*b* and 156*c* may minimize escape of aerosolized particles 162 from within an area bounded by said air curtains 156*a*, 156*b* and 156*c*. Moreover, negative pressure created at the inlet 107 of the hood 104 by the evacuation system 138 may draw in the aerosolized particles 162 and exhaust them out the exhaust 135. Such aerosolized removal systems 101 may minimize health hazards to professionals working in and around the treatment zone 117.

Figure 2:
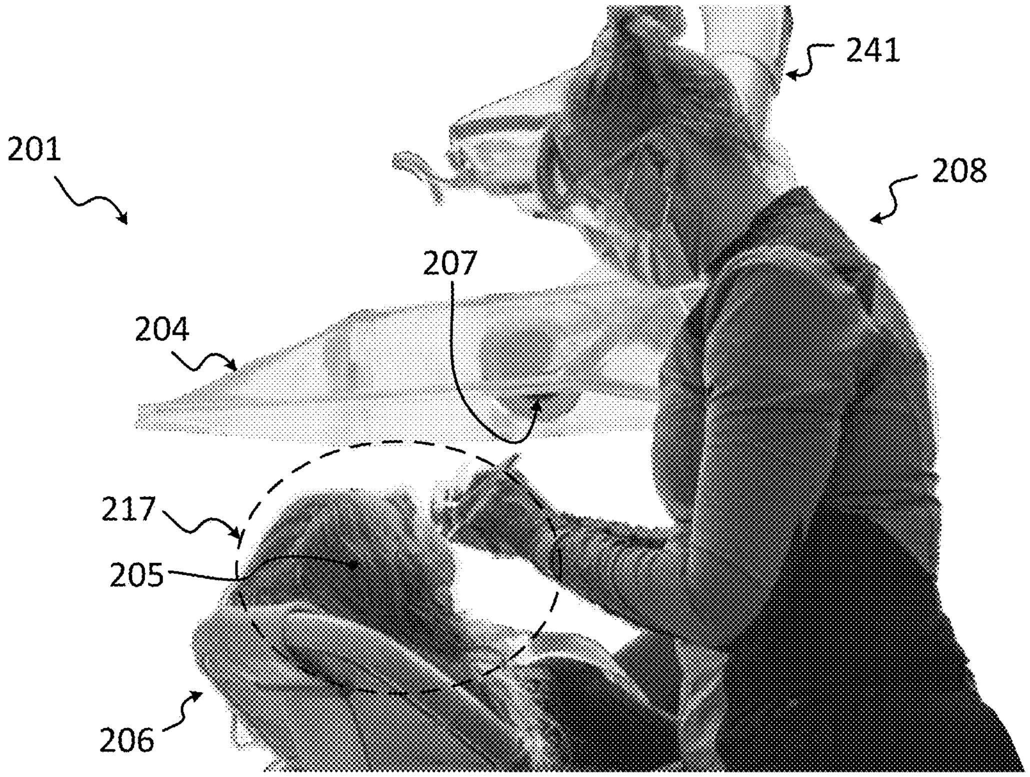
FIG. 2 illustrates another exemplary aerosol removal system.

FIG. 2 illustrates another implementation of an aerosol removal system 201. As shown, the aerosol removal system 201 includes a hood 204, which is shown positioned above a dental patient 205 in a dental chair 206 (adjacent and above a treatment zone 217 that corresponds to a region around the mouth of the dental patient 205). The hood 204 includes an inlet 207 that is fluidly coupled via a conduit 241 to an evacuation system (not shown). A pressure-differential generator in the evacuation system may create a negative pressure in the conduit 241 and the hood 204 so as to draw aerosolized particles from the treatment zone 217 into the intake 207 and away from a hygienist 208. In some implementations, the aerosol removal system 201 protects the hygienist 208 from such aerosolized particles that may be released from treatment of the dental patient 205.

Figure 3A:
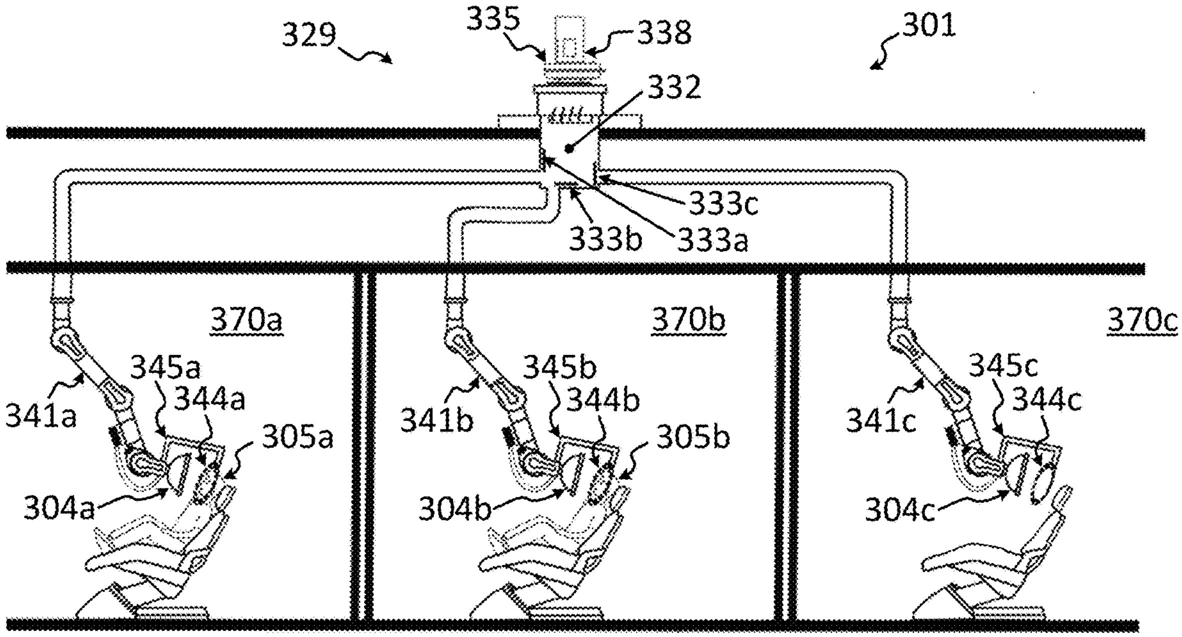
FIGS. 3A-3C illustrate variations of an aerosol removal system disposed in a multi-treatment zone implementation.

FIG. 3A illustrates one implementation of an aerosol removal system 301 installed in a clinical setting that includes multiple treatment suites 370*a*, 370*b* and 370*c*. The specific clinical setting is depicted as a dental clinic. As shown, patients 305*a* and 305*b* are situated in suites 370*a* and 370*b*, respectively; but suite 370*c* does not include a patient. As shown, each suite includes a hood 304*a*. 304*b* and 304*c*. Each hood 304*a*, 304*b* and 304*c* is coupled via corresponding conduits 341*a*, 341*b* and 341*c* to an evacuation system 329 that includes a pressure-differential generator 338 (e.g., a fan, blower or compressor) that draws air into an intake manifold 332 (and by extension, into each hood 304*a*, 304*b* and 304*c* via the corresponding conduits 341*a*, 341*b* and 341*c*-which, as shown, are fluidly coupled to the intake manifold 332), then evacuates that air out of an exhaust 335.

As shown, the exhaust 335 is external to the suites 370*a*, 370*b* and 370*c*. In some implementations, the exhaust 335 is exterior to a building in which the suites 370*a*, 370*b* and 370*c* are disposed (e.g., substantially fluidly isolated from the suites); in other implementations, the exhaust 335 is exterior to the suites 370*a*, 370*b* and 370*c* but within a building containing said suites; in still other implementations, the exhaust is disposed in an interior space that is common with the suites 370*a*, 370*b* and 370*c*. The evacuation system 329 may include various filtration elements (e.g., filters, high efficiency particulate air (HEPA) filters; photocatalytic oxidation (PCO) filters; antibacterial treatment elements (e.g., ultraviolet lights, gamma radiation elements, ozone generators); etc.).

In implementations such as the one shown in FIG. 3A, the intake manifold 332 may include valves or gates 333*a*, 333*b* and 333*c* that close off specific conduits to suites that are unoccupied. For example, as shown, suite 370*c* is unoccupied, and gate 333*c* is shown as being closed; whereas suites 370*a* and 370*b* are shown as occupied and corresponding gates 333*a* and 333*b* are shown as open. Gates 333*a*, 333*b* and 333*c* may be manually operated (e.g., mechanically or electrically, by an operator of the system 301 in each suite 370*a*, 370*b* and 370*c*); or the gates 333*a*, 333*b* and 333*c* may be automatically operated (e.g., controlled by a control system and corresponding sensors in the suites 370*a*, 370*b* and 370*c* or chairs 306*a*, 306*b* and 306*c*).

In the implementation shown in FIG. 3A, each hood 304*a*, 304*b* and 304*c* is disposed opposite a corresponding air curtain generator 344*a*, 344*b* and 344*c*. As shown, each air curtain generator 344*a*, 344*b* and 344*c* is coupled to its corresponding hood 304*a*, 304*b* and 304*c* with a corresponding arm 345*a*, 345*b* and 345*c*. In other implementations, such as the one shown in FIG. 3B, air curtain generators 344*aa*, 344*bb*, and 344*cc* may be disposed behind (and, in some implementations, attached to) corresponding dental chairs 306*a*, 306*b* and 306*c* (rather than being directly coupled to corresponding hoods 304*a*, 304*b* and 304*c*).

Figure 3B:
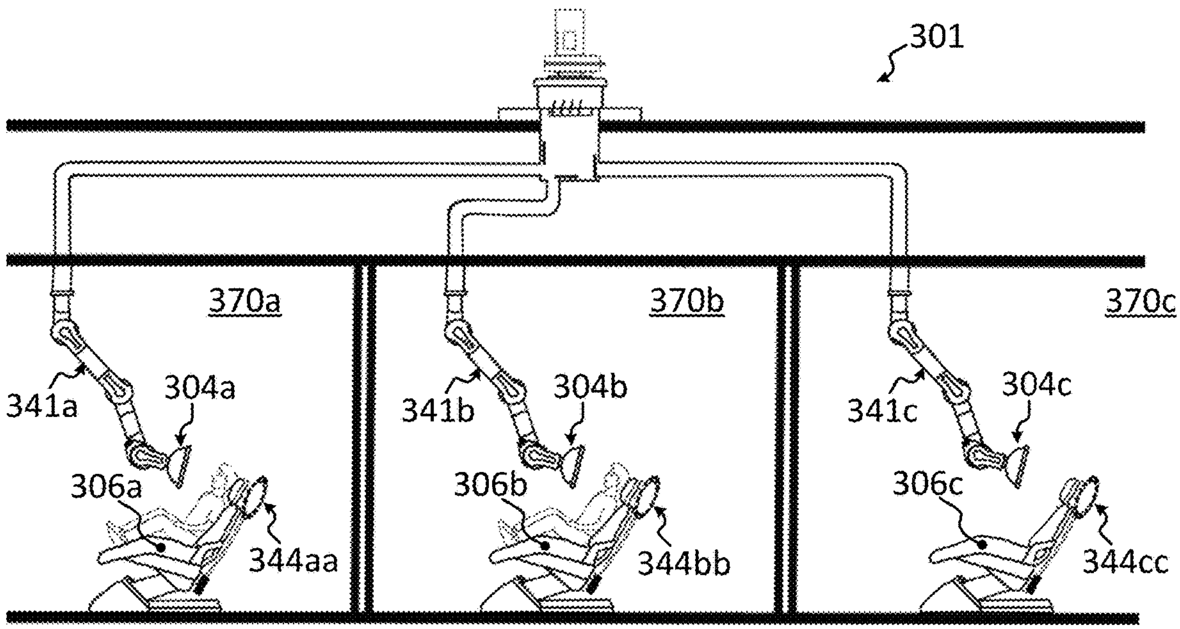

As shown in FIGS. 3A and 3B, in some implementations, the hoods 304*a*, 304*b* and 304*c* are supported by corresponding conduits 341*a*, 341*b* and 341*c*-which themselves may be mounted to a ceiling as shown (or mounted to movable tracks that are themselves mounted to a ceiling or wall-such as movable tracks that are known in the dental and medical arts for supporting treatment accessories such as lights, suction, etc.). In other implementations (not shown), the hoods 304*a*, 304*b* and 304*c* may be supported by separate structures, and the conduits 341*a*, 341*b* and 341*c* may only facilitate airflow therethrough without providing structural function. In some implementations, a hood and its corresponding inlet may be integrated with another tool, such as an operatory light (e.g., the inlet may circumferentially surround the light).

Figure 3C:
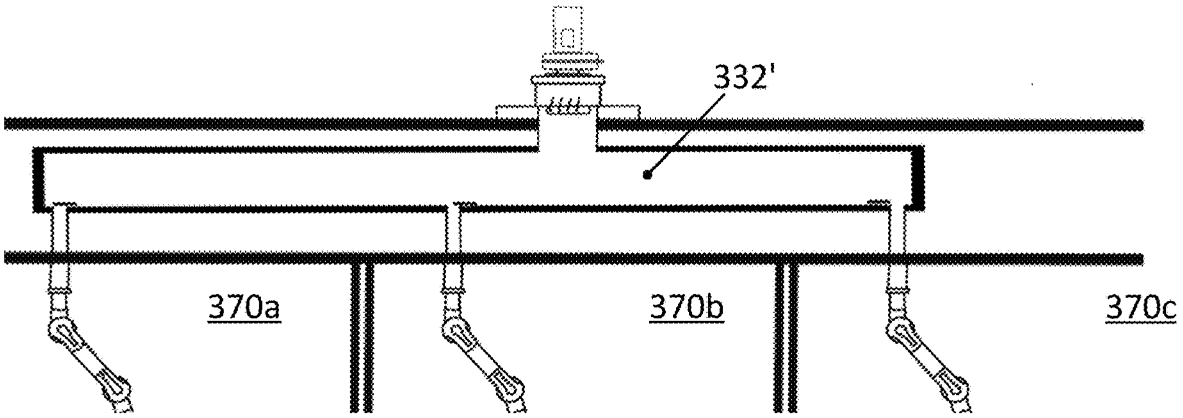

In some implementations, such as the one depicted in FIG. 3C, the intake manifold 332' may be more substantial than the intake manifold 332 shown in FIGS. 3A and 3B. In particular, the intake manifold 332' may comprise a plenum that traverses a ceiling space above each of the multiple suites 370*a*, 370*b* and 370*c*.

Figure 4A:
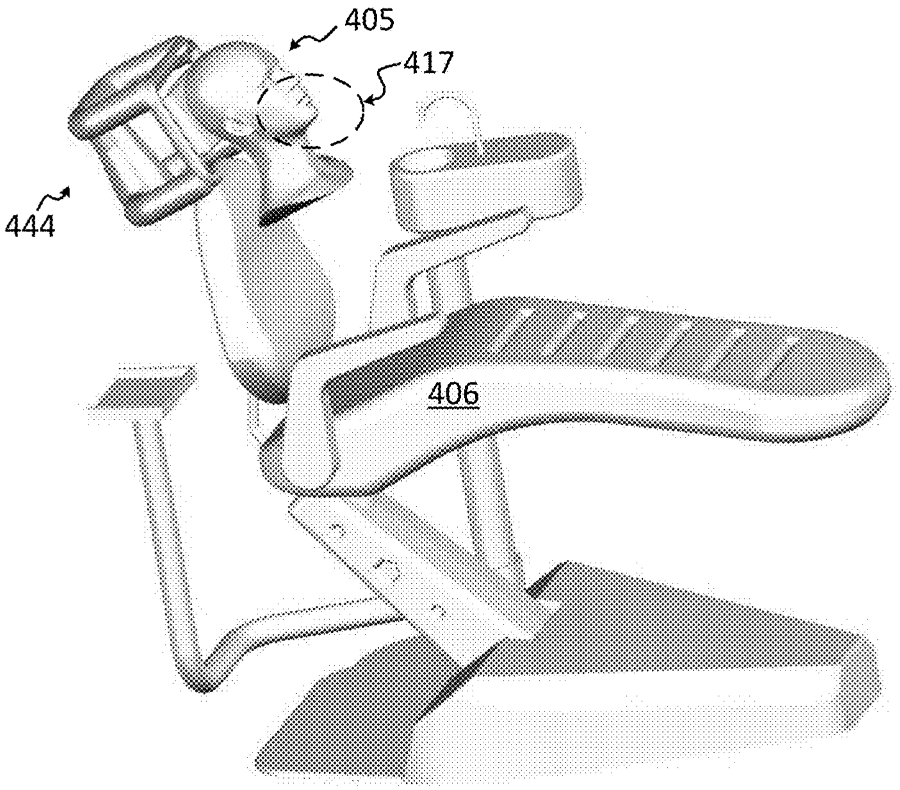
FIG. 4A illustrates an exemplary air curtain generator.
Figure 4B:
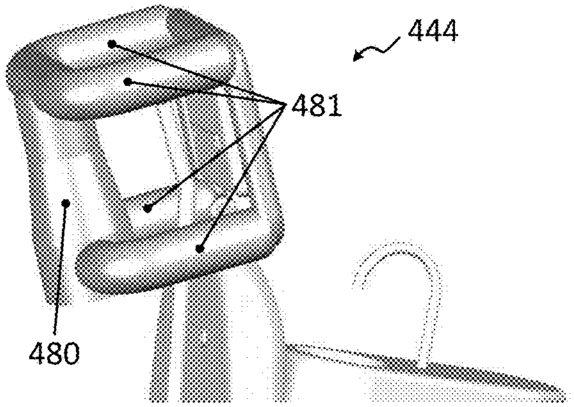
FIGS. 4B and 4C illustrate additional detail of the air curtain generator of FIG. 4A.
Figure 4C:
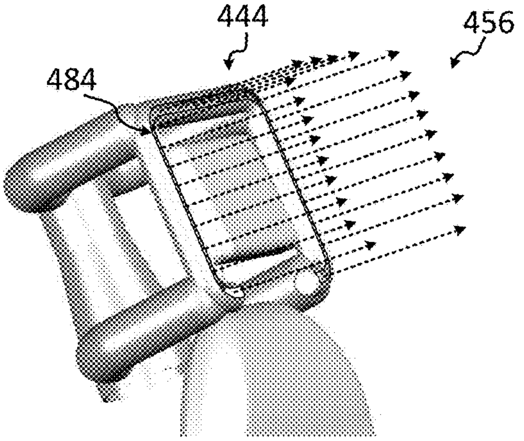

FIG. 4A illustrates one implementation of a portion of an aerosol removal system that includes an air curtain generator 444 that is disposed on a dental chair 406, behind a portion of the dental chair 406 in which the head of a patient 405 would rest. FIGS. 4B and 4C illustrate additional detail of the air curtain generator 444. As shown, the air curtain generator 444 includes a manifold 480 and air distribution conduits 481 that distribute air from a compressor, blower or fan (not shown) to a slot 484 that circumferentially surrounds a treatment zone 417 associated with the patient 405. In some implementations, pressurized air from the compressor, blower or fan is fluidly coupled to manifold 480 and air distribution conduits 481 and routed out the slot 484 to form an air curtain 456. Various other configurations and designs are possible for an air curtain generator 444.

Figure 5A:
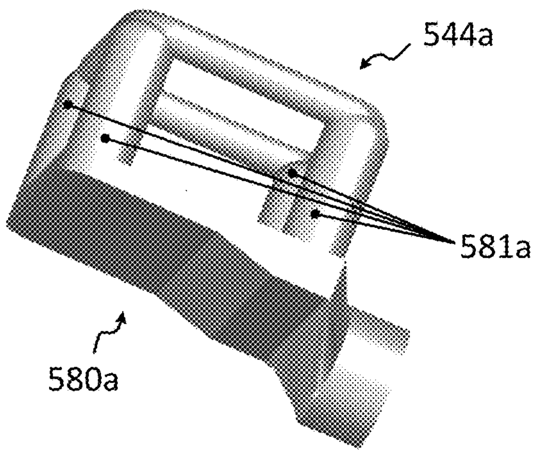
FIGS. 5A-5C illustrate implementations of exemplary air curtain generators.
Figure 5B:
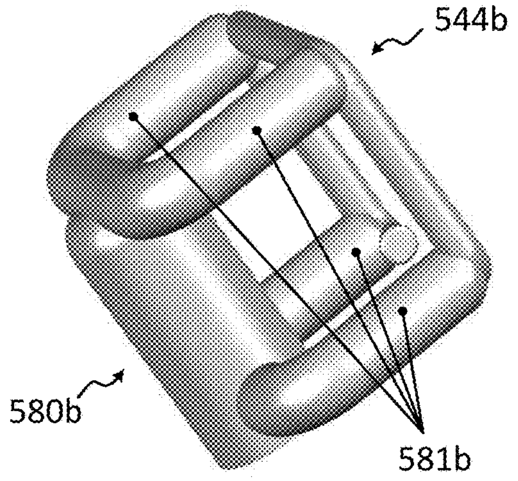

FIG. 5A illustrates another implementation of an air curtain generator 544*a*. As shown, a manifold 580*a* and distribution conduits 581*a* may route air from a compressor, blower or fan (not shown) to corresponding slots or plurality of outlets (not shown). FIG. 5B illustrates another implementation of an air curtain generator 544*b*, with a differently designed manifold 580*b* and distribution conduits 581*b*.

Figure 5C:
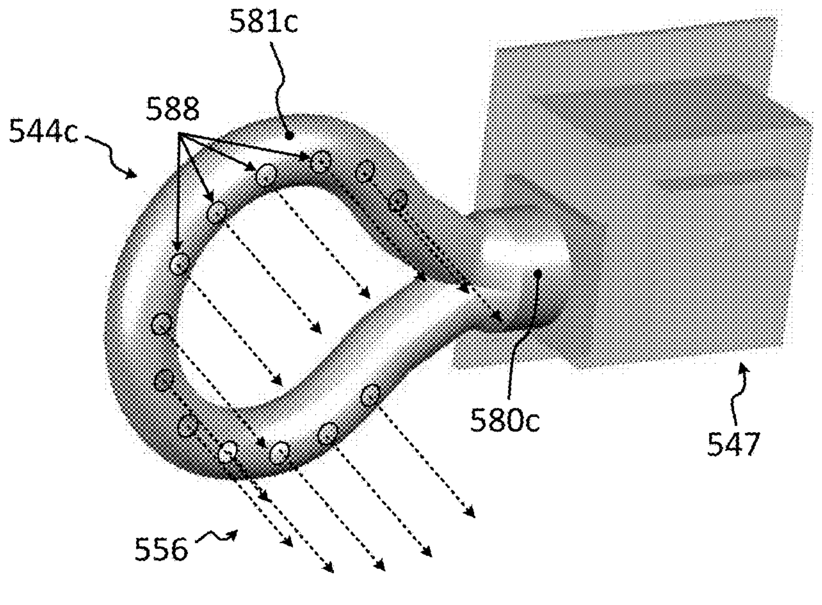

FIG. 5C illustrates another implementation of an air curtain generator 544*c*. As shown, a manifold 580*c* distributes pressurized air from a compressor 547 to a distribution channel 581*c*, which, as shown, includes a plurality of outlets 588 for creating an air curtain 556. The compressor 547 (which may alternatively be referred to a blower or fan, depending, for example, on the pressure differential it creates) may be disposed close to the manifold (e.g., behind a corresponding dental chair or otherwise in the vicinity of the treatment zone); or the compressor 547 may be disposed away from the distribution channel 581 and coupled thereto with a larger or longer manifold 580*c* or conduit (not shown).

Other designs using different shapes, different manifold types and different outlets (e.g., individual holes of different sizes, one or more slots, a combination thereof, etc.) may be employed to generally create an air current that is configured to substantially prevent aerosolized particles on either side of the air curtain 556 from traversing the air curtain 556 itself.

Other features may be included in an aerosol removal system. For example, sound cancellation technology may be employed to minimize the sound of the air curtain and or hood heard by either a patient or hygienist or another clinician. The air curtain may be treated or conditioned to provide other functions. For example, humidity may be added or removed; the air may be perfumed or colored; particles may be added to the air flowing through the air curtain (e.g., particles that provide antibacterial or antiviral functionality); etc. Sensors and valves (not shown) may facilitate selective control of a portion of an air curtain—for example, to temporarily turn off or attenuate a portion of the air curtain when a clinician reaches through the air curtain (e.g., to enhance clinician comfort, minimize clinician annoyance, and/or minimize turbulent flow that might otherwise disrupt flow of aerosolized particles to an evacuation system). Additional features may be included to assist users in aligning an air current generator with a hood or other portion of an evacuation system. For example, an air current generator may include alignment beams (e.g., laser beams) that illuminate a target portion of the hood when alignment is optimal; as another example, sensors may be included in the hood that detect flow from the air curtain generator, or another signal (e.g., a laser, light or ultraviolet light beam originating on a portion of the air curtain generator), to provide some indication of the detection (e.g., flashing an indicator light, emitting a sound) when alignment is optimal or acceptable.

In some implementations, addition of sound cancellation may enable stronger airflow in the air curtain, which may, in turn, enable a corresponding hood to be placed farther away from a treatment zone. In some implementations, it may be possible to have an air curtain that is sufficiently strong to enable a corresponding hood to be eliminated altogether or replaced with a vent or hood on a ceiling or wall adjacent a treatment zone.

Several implementations have been described with reference to exemplary aspects, but it will be understood by those skilled in the art that various changes may be made and equivalents may be substituted for elements thereof without departing from the contemplated scope. For example, the terms "fan," "blower" and "compressor" have been used herein. In some implementations, these terms have their widely accepted meaning—for example, a fan may refer to a device whose outlet pressure to inlet pressure is up to about 1.11; a blower may refer to a device whose outlet pressure to inlet pressure is between 1.11 and 1.2; and a compressor may refer to a device whose outlet pressure to inlet pressure is above about 1.2. (As used herein, "about." "approximately." or "approximate" may mean within 1%, or 5%, or 10%, or 20%, or 50%, or 100% of a nominal value or dimension.) In some implementations, fans, blowers or compressors may be interchanged; or, these terms may be used herein interchangeably. Illustrations and descriptions are provided with reference to a dental clinic; but the systems and methods described herein may be employed in other applications, such as medical, surgical or veterinary applications. A hood may be integrated with other apparatus-such as, for example, an operatory or examination light. A hood may or may not have a central axis configured to be disposed substantially normal to a plane associated with a treatment zone. A hood may be freestanding or mounted with a structural arm to a ceiling or wall. The structural arm may articulate in various direction (e.g., bend, pivot, extend, contract, swivel, etc.). A conduit may provide structural support for a hood, or the hood may be separately supported by another structure independent of the conduit. An evacuation unit may be inside or outside a building that includes treatment zones within treatment suites. An aerosol removal system may support a single treatment zone or multiple treatment zones within one or more treatment suites. Additional filtering may be provided by the evacuation unit prior to exhaust from the aerosol removal system being released. Systems may be configured to remove hazards other than aerosols from a region, and the region may be other than a treatment region. For example, a system may be configured to remove other hazardous materials, such as gases, vapors, dusts, microbes, etc. Moreover, systems may be configured for use apart from human or animal patients, such as, for example, in laboratory settings—where certain operations (e.g., molding, shaping, burring, painting, etc.) may cause harmful substances to be emitted or produced near an operator, which harmful substances may be removed by such a system.

Many other variations are possible, and modifications may be made to adapt a particular situation or material to the teachings provided herein without departing from the essential scope thereof. Therefore, it is intended that the scope include all aspects falling within the scope of the appended claims.

What is claimed is:

1. An aerosol removal system comprising:

a hood comprising an inlet with a central axis and an outlet; the hood configured to be positioned on a first side of a treatment zone for a human or non-human patient undergoing a medical, dental or veterinary procedure, with the central axis substantially normal to a plane associated with the treatment zone;

an air curtain generator that is distinct from and mechanically decoupled from the hood, the air curtain generator comprising (a) a plurality of outlets configured to be positioned on a second side of the treatment zone substantially opposite the first side and on the other side of the plane relative to the first side, wherein the plurality of outlets are arranged such that when they are positioned as they are configured to be positioned, the plurality of outlets are circumferentially disposed around a substantial portion of a periphery of the treatment zone; (b) a compressor that compresses air; and (c) a manifold that fluidly couples the compressor to the plurality of outlets and facilitates the forceful ejection of compressed air from the compressor through the plurality of outlets, toward the inlet; and an evacuation system having an intake, an exhaust and a pressure-differential generator; wherein the intake is coupled to the outlet via a conduit and the pressure-differential generator creates a pressure differential between the intake and exhaust, such that air and aerosolized particles are drawn into the inlet, through the evacuation system and ejected out the exhaust.

2. The aerosol removal system of claim 1, wherein the hood is disposed in an interior space and the exhaust is disposed exterior to and substantially fluidly isolated from the interior space.

3. The aerosol removal system of claim 1, wherein the compressor compresses air from the vicinity of the treatment zone.

4. The aerosol removal system of claim 1, wherein the pressure-differential generator comprises a fan, blower or compressor.

5. The aerosol removal system of claim 1, wherein the conduit comprises a segmented and articulated tube that is mounted above or next to the treatment zone.

6. The aerosol removal system of claim 1, wherein the hood is disposed around a light configured to illuminate the treatment zone.

7. The aerosol removal system of claim 1, wherein the treatment zone comprises a dental chair.

8. The aerosol removal system of claim 7, wherein the plurality of outlets are disposed around and behind a head portion of the detail chair.

9. The aerosol removal system of claim 1, wherein the plurality of outlets comprise a plurality of slots.

10. The aerosol removal system of claim 1, wherein the treatment zone comprises a substantially rectangular operating table.

11. The aerosol removal system of claim 10, wherein the plurality of outlets are disposed along three sides of the operating table.

* * * * *